United States Patent [19]
Ohshita et al.

[11] Patent Number: 5,873,428
[45] Date of Patent: Feb. 23, 1999

[54] ALL WHEEL DRIVE VEHICLE

[75] Inventors: Shigeru Ohshita, Iwata, Japan; Lars Jansson; Leif Gustafsson, both of Upplands Vasby, Sweden

[73] Assignee: Yamaha Hatsudoki Kabushiki Kaisha, Iwata, Japan

[21] Appl. No.: 763,828

[22] Filed: Dec. 11, 1996

[30]    Foreign Application Priority Data

Dec. 13, 1995  [JP]  Japan ................................. 7-346742

[51] Int. Cl.⁶ .................................................. B62M 7/12
[52] U.S. Cl. ......................... 180/224; 180/307; 180/308
[58] Field of Search .................................. 180/223, 224, 180/307, 308

[56]              References Cited

U.S. PATENT DOCUMENTS 4,157,739  6/1979  Frye ........................................ 180/307
4,955,451  9/1990  Schaefer ................................... 180/307
5,472,062  12/1995  Nagai et al. ............................. 180/308

FOREIGN PATENT DOCUMENTS 2589213    4/1987   France .
61-125974  6/1986   Japan .
1273782    11/1989  Japan .
592794     4/1993   Japan .
5112155    5/1996   Japan .

*Primary Examiner*—Kevin Hurley
*Attorney, Agent, or Firm*—Knobbe, Martens, Olson & Bear LLP

[57]             ABSTRACT

A hydrostatic drive assembly for a front wheel of a motorcycle type steered vehicle. The hydrostatic drive is configured so that the hydrostatic motor is nested behind the front fork and contained within the area encompassed by the hub of the front wheel so as to permit the use of a conventional type of front wheel and mounting arrangement.

20 Claims, 6 Drawing Sheets

ALL WHEEL DRIVE VEHICLE

BACKGROUND OF THE INVENTION

This invention relates to a vehicle and more particularly to a vehicle such as a motorcycle in which all wheels are driven.

As is well known in many types of vehicles, only the wheels at one end of the vehicle are driven. With a motorcycle, the rear wheel is normally driven and the dirigible front wheel is not driven. There are times, however, where it is desirable to also drive the front wheel of a motorcycle. However, because of the unique arrangement for the front wheel steering and suspension, conventional transmission systems do not lend themselves to application to conventional type of motorcycles.

There have been proposed, therefore, motorcycle front wheel drives wherein a hydrostatic transmission is employed. This hydrostatic transmission is comprised of a pump driven by the engine and a hydrostatic motor which drives the front wheel through a gearing arrangement. In one type of arrangement which has been proposed, the hydrostatic motor is disposed on one side of the wheel and drives the wheel through a gear transmission. This places the motor in an exposed location where it is likely to be damaged. Furthermore, the exposed positioning for the motor also puts the hydraulic lines in a position where they also could be damaged. In addition the side to side balance of the motorcycle will become unbalanced.

With another type of arrangement, the hydrostatic motor is actually nested within the hub of the front wheel. This avoids some of the aforenoted problems but introduces problems of its own. For example, with this type of arrangement, the front fork assembly and front wheel must all be specially manufactured for this purpose. Thus, this type of system cannot be easily adapted to existing motorcycles.

It is, therefore, a principal object of this invention to provide an improved and simplified driving arrangement for a dirigible front wheel of a vehicle such as a motorcycle.

It is a further object of this invention to provide an improved and compact hydrostatic motor, front wheel drive arrangement for a motorcycle.

It is yet further object of this invention to provide a compact motor, transmission arrangement for driving a motorcycle front wheel wherein the front wheel can be relatively conventional in construction and the front fork need not be specially adapted for the hydrostatic drive.

SUMMARY OF THE INVENTION

This invention is adapted to be embodied in a vehicle that is comprised of a frame assembly that mounts an internal combustion engine. At least one rear wheel is journalled for rotation at the rear of the frame assembly. A first transmission drives the rear wheel from the internal combustion engine. At least one front wheel is dirigibly supported at the front of the frame assembly for steering of the vehicle. The front wheel has a hub portion. A hydrostatic motor is mounted by the frame assembly within an area encompassed by the front wheel hub. A second transmission drives the front wheel from the hydrostatic motor. A pump is driven by a third transmission from the internal combustion engine and supplies fluid under pressure to the hydrostatic motor through a suitable hydraulic conduit and control arrangement.

DETAILED DESCRIPTION OF THE PREFERRED EMBODIMENTS OF THE INVENTION

Figure 1:
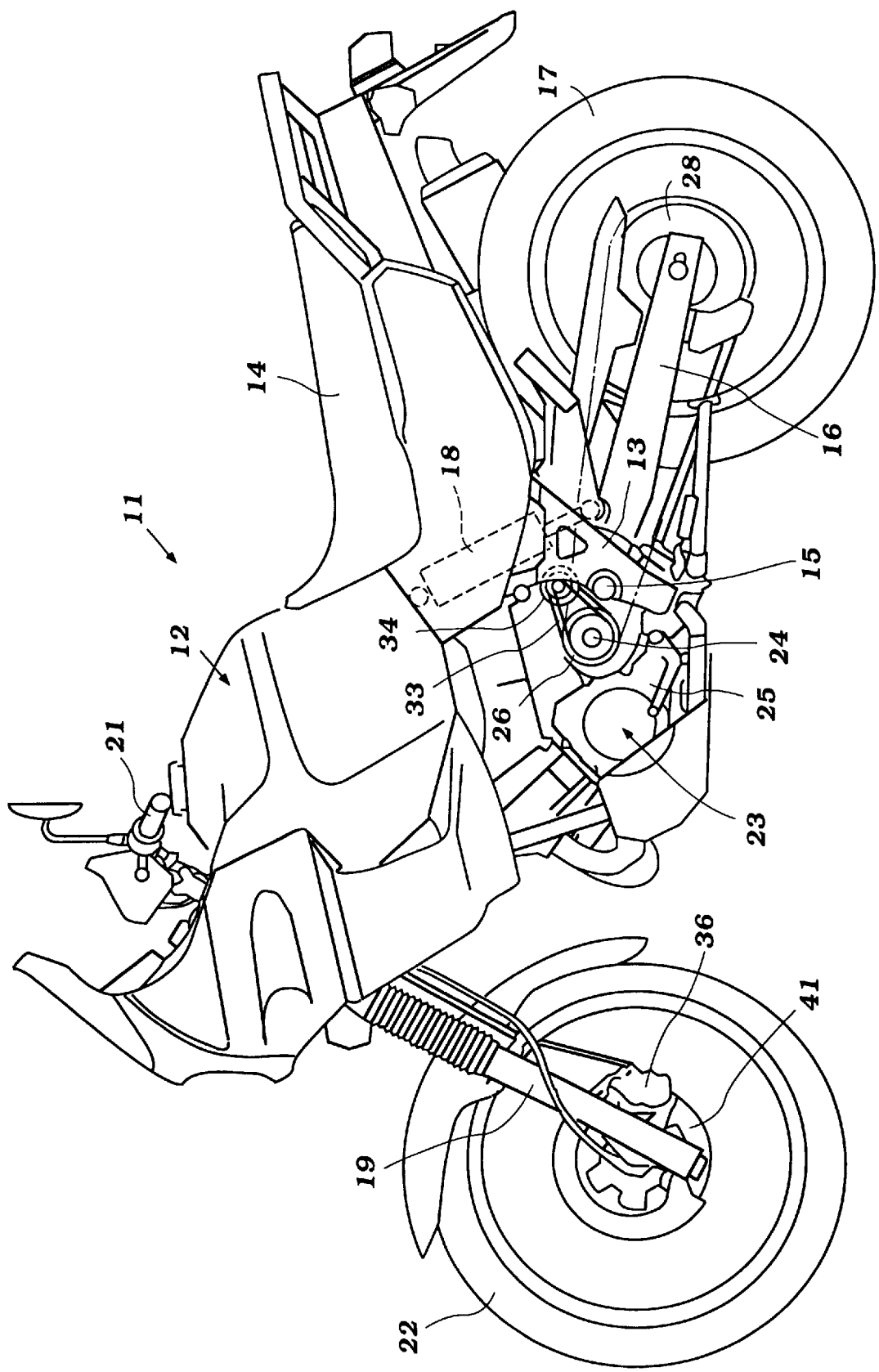
FIG. 1 is a side elevational view of a motorcycle constructed in accordance with an embodiment of the invention.
Figure 2:
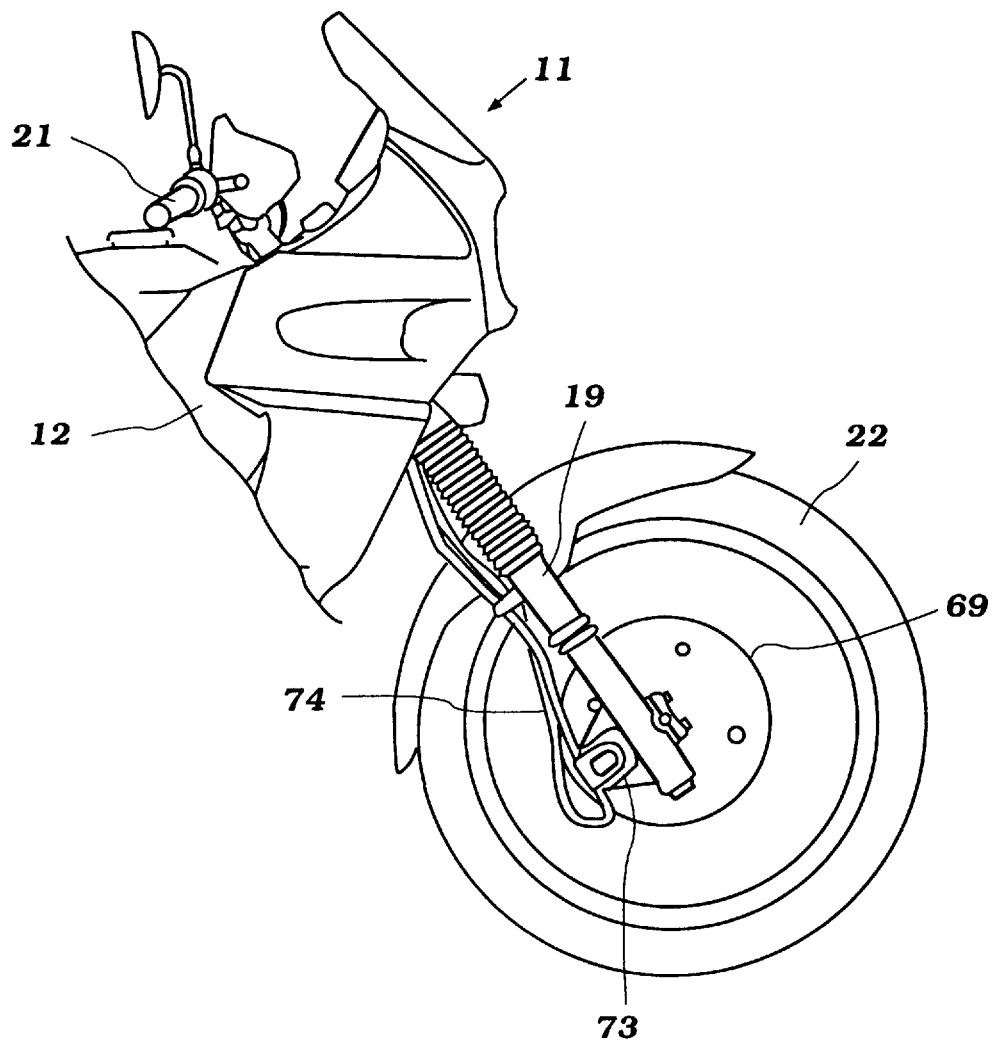
FIG. 2 is a partial side elevational view, showing the side opposite that illustrated in FIG. 1 and showing only the front portion of the motorcycle.

Referring now in detail to the drawings and initially to FIGS. 1 and 2, a motorcycle constructed and driven in accordance with an embodiment of the invention is identified generally by the reference numeral 11. The invention is described in conjunction with a motorcycle because it has particular utility in such applications. It will be understood, however, that certain facets of the invention may be utilized with other types of vehicles, and particularly those types of vehicles that have front wheel steering systems similar to that employed in a motorcycle and utilizing a front fork.

The motorcycle 11 is comprised of a body, frame assembly, indicated generally by the reference numeral 12 and which may be of any known type. The frame assembly, however, is provided with a rear bracket 13 which is disposed beneath a rider's seat 14 and slightly forwardly of it. The rear bracket 13 provides a pivotal connection at the pivot point 15 to a trailing arm assembly 16. A rear wheel 17 is rotatably journalled at the rear end of this trailing arm assembly 16. The trailing arm assembly 16 has its pivotal movement relative to the body, frame assembly 12 controlled by a suspension unit 18 which is loaded in any appropriate manner.

A front fork assembly 19 is dirigibly supported at the forward end of the body frame assembly 12 and is steered by a handlebar 21 in a known manner. A front wheel 22 is rotatably journalled at the lower portion of the front fork assembly 19 also in any known manner. This construction will be described in more detail later by reference to FIG. 6.

An internal combustion engine, indicated generally by the reference numeral 23, is mounted in the frame portion of the frame body assembly 12 and has, in accordance with standard motorcycle practice, an integral change speed transmission contained within its crankcase. This change speed transmission drives a transmission output shaft 24 at the rider's selected speed ratio.

The engine 23 provides motive power for driving not only the rear wheel 17 but also the front wheel 22. This driving arrangement is shown in part schematically in FIG. 3 and will be described in part now by reference to that figure.

The crankcase change speed transmission assembly of the engine 23 is shown in some more detail in this figure and is indicated generally by the reference numeral 25. It will be seen that a first driving sprocket 26 of a first transmission is affixed to the outer end of the transmission output shaft 24. This sprocket 26 drives a driving chain 27 which is also trained around a sprocket 28 which is affixed for rotation with a hub 29 of the rear wheel 17 for driving it in a well known manner.

A hydrostatic transmission is provided for driving the front wheel 22 under the selected control of the operator. This hydrostatic transmission is comprised of a fluid pump 31 which is mounted in a manner which will be described later by reference to FIGS. 1, 4 and 5. A second transmission drives this fluid pump 31. The second transmission is comprised of a driving sprocket 32 that is fixed to the transmission output shaft 24 inwardly of the rear wheel driving sprocket 26. A second chain 33 is driven by this sprocket 32 and drives a sprocket 34 that is affixed for rotation to a drive shaft 35 of the pump 31.

The pump 31 supplies hydraulic pressure through a fluid control circuit to a hydrostatic motor 36 of the swash plate type. This hydrostatic motor 36 has an output shaft 37 to which a pinion gear 38 is affixed. This pinion gear 38 drives a ring gear 39 which is fixed to the hub 41 of the front wheel 22. The mounting arrangement for the hydrostatic motor 36 and the third transmission comprised of the gears 38 and 39 will be described later by particular reference to FIGS. 1 and 6.

Figure 3:
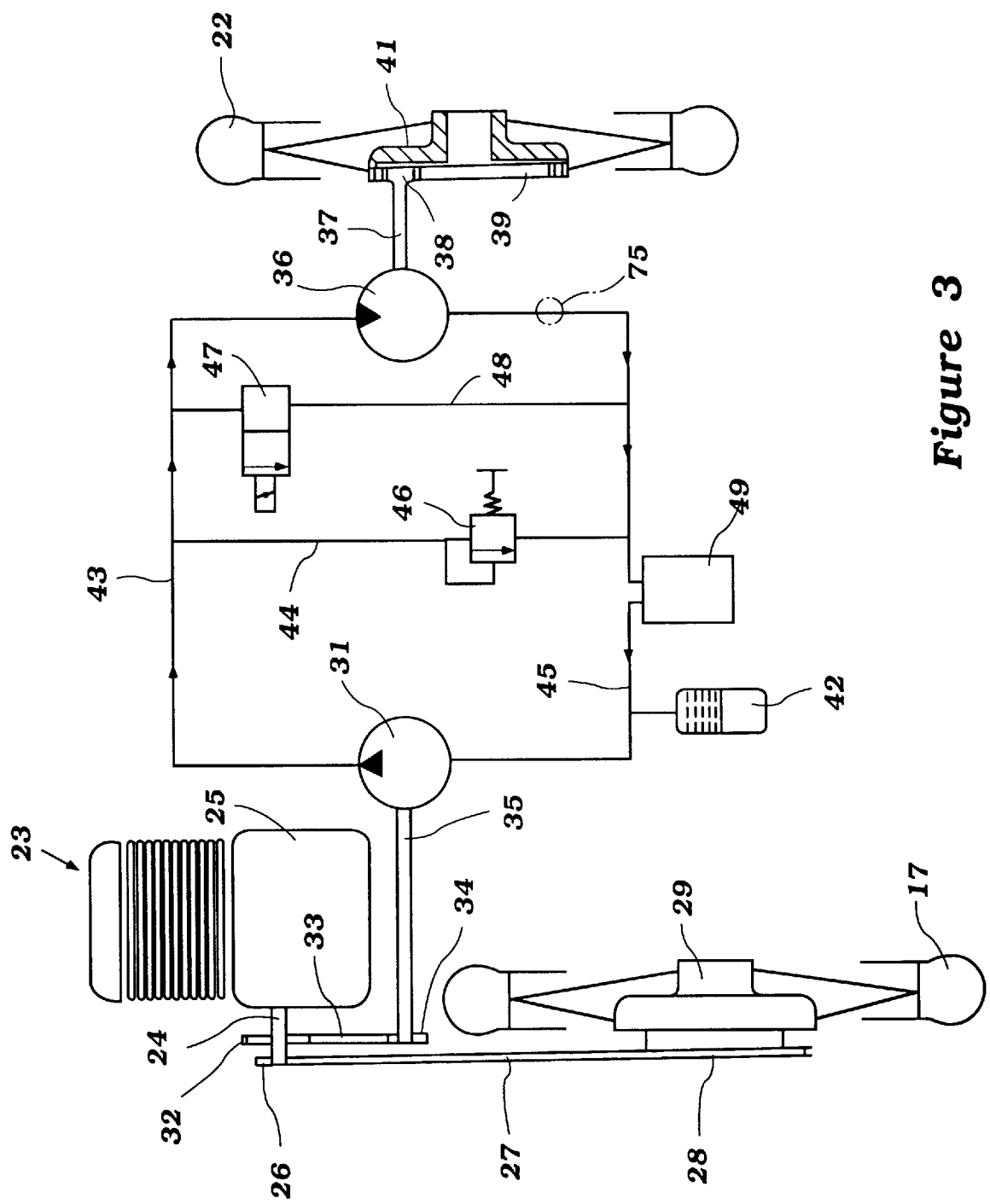
FIG. 3 is a partially schematic view showing the driving arrangement for the front and rear wheels of the motorcycle.

Continuing to refer to FIG. 3, the control circuit and fluid conduit is comprised of a combined accumulator reservoir 42 that supplies fluid to the input side of the pump 31. The pump 31 delivers pressurized fluid to a conduit 43 which, in turn, supplies fluid pressure to the inlet side of the hydrostatic motor 36.

A pressure regulating bypass line 44 extends across the inlet line 43 and a return line 45 that communications with the accumulator chamber and reservoir 42. A pressure relief valve 46 is provided in this line and controls the maximum pressure that can be exerted by the pump 31 on the hydrostatic motor 36.

An operator control valve 47 is placed in a further bypass line 48 between the lines 43 and 45. When the valve 47 is placed by the operator in its closed position as shown in FIG. 3, fluid will be delivered to the hydrostatic motor 36 to drive the front wheel 22. When the valve is in its off or open position, the pumped fluid will be bypassed through the line 46 around the motor 36 and no hydrostatic drive will occur.

A filter 49 is placed in the return line 45 for filtering the pumped fluid.

Figure 4:
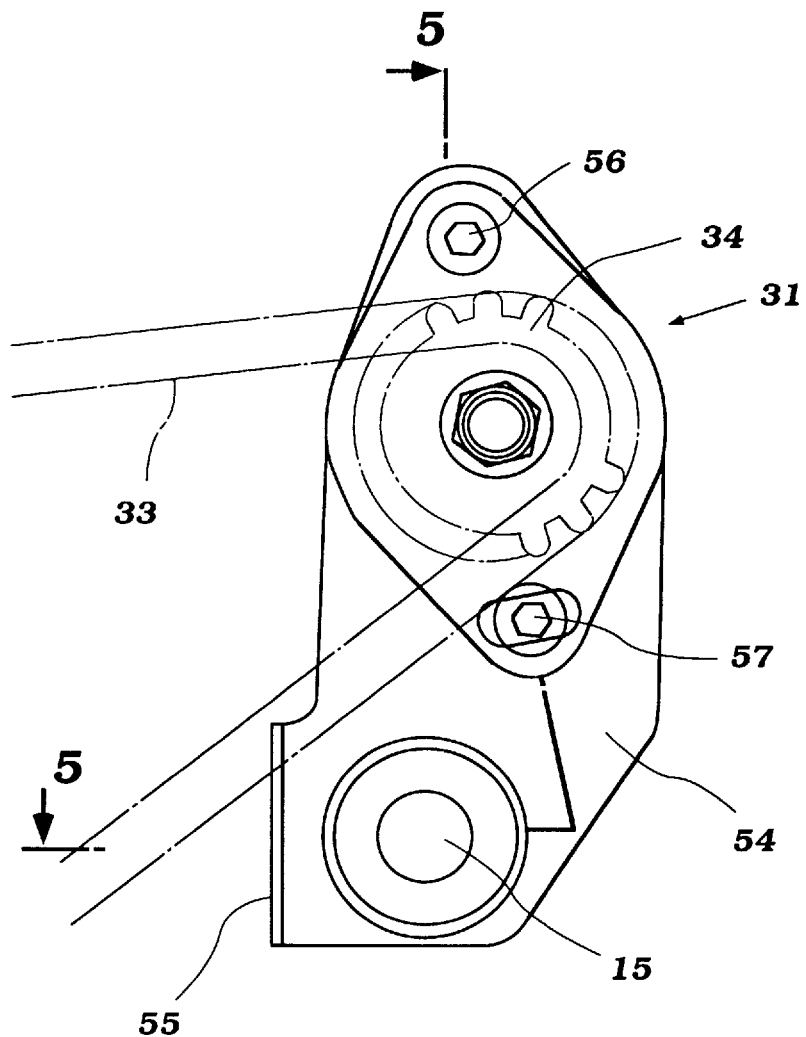
FIG. 4 is an enlarged side elevational view looking in the same direction as FIG. 1 and shows the drive arrangement between the engine and the pump of the hydrostatic transmission.
Figure 5:
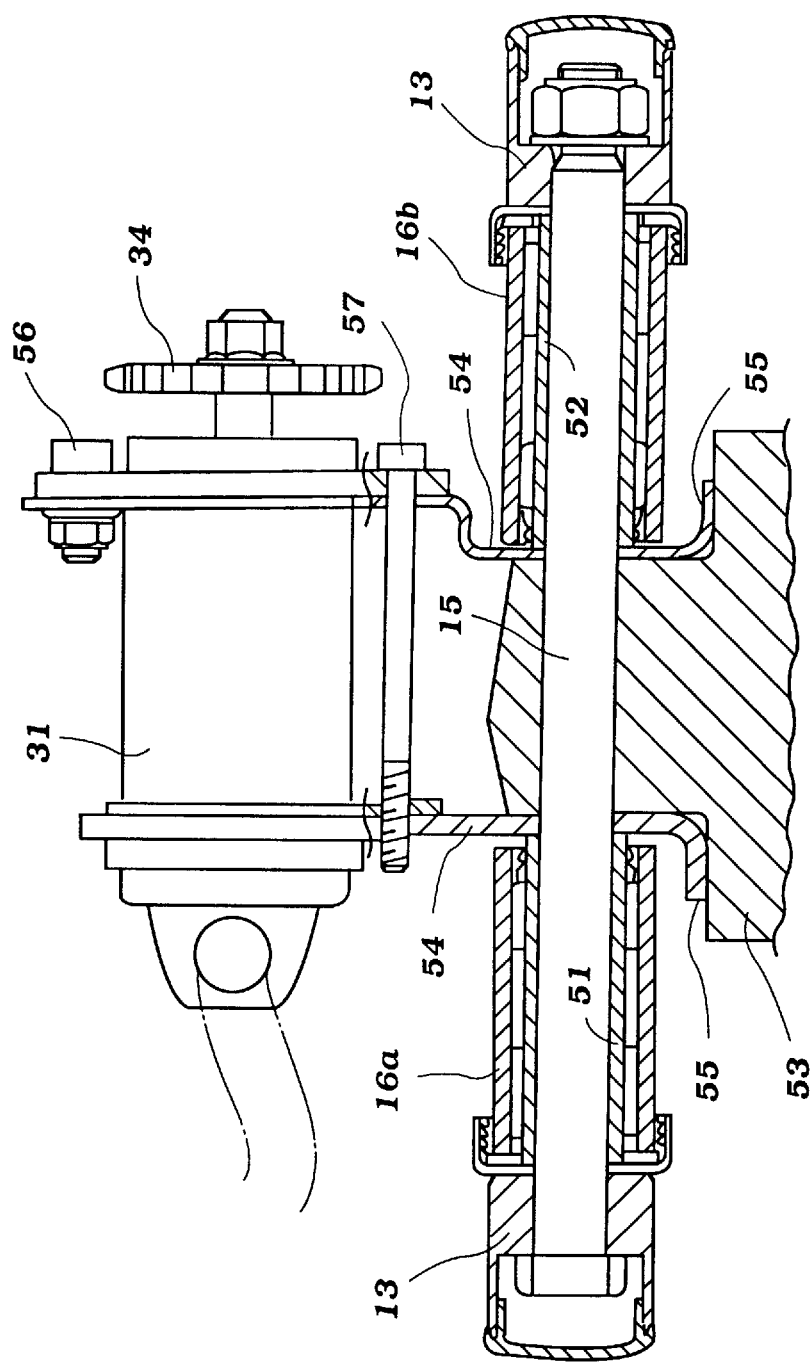
FIG. 5 is cross-sectional view taken along the line 5—5 of FIG. 4 and shows primarily the mounting for the pump of the hydrostatic transmission.

Referring now primarily to FIGS. 4 and 5, although the structure also appears in FIG. 1, the mounting arrangement for the pump 31 will be described. As may be seen best in FIG. 5, the pivot bolt 15 for the trailing arm 16 supports bifurcated forward portions 16a and 16b thereof on respective bushings 51 and 52. This pivot bolt 15 also passes through a lug 53 of the casing of the crankcase transmission assembly 25 of the internal combustion engine 23.

A pair of brackets 54 are mounted on opposite sides of the lug 53 and disposed inwardly of and held in place partially by the bushings 51 and 52. These brackets 54 have respective shoulder portions 55 which are engaged with the transmission case lug 53 for holding the brackets against rotation. One of the brackets 54 is provided with a mounting lug that receives a pivot bolt 56 which can be selectively tightened or loosened and which carries the pump 31.

A bolt 57 extends through the brackets 54 and has a threaded connection to the bracket that does not carry the pivot bolt 56. Rather, this bracket is formed with a slot so as to permit pivotal movement of the fluid motor 31 about the pivot bolt 56 so as to set the tension on the chain 33 in a manner which is believed to be apparent.

Because of this mounting of the fluid motor 31, contiguous to and between the motorcycle frame brackets 13, it will be well protected from damage as will the hydraulic conduits which extend from it to and from the hydraulic circuit shown in FIG. 3. Except for the hydrostatic motor 36, this hydraulic circuitry can be mounted within the body frame assembly 12 at appropriate locations.

The construction associated with the front wheel 22 and specifically the driving and braking arrangement therefor will now be described by primary reference to FIGS. 1, 2 and 6.

Referring first to FIG. 1, it will be seen that the hydrostatic motor 36 is mounted on the left-hand side of the motorcycle. This mounting is disposed adjacent to and to the rear of the respective fork side 19a. It will also be seen that the front wheel 22 has a hub portion, indicated generally by the reference numeral 58, which is open at this side and which defines a cavity by means of an internal flange portion 59 thereof which cavity is identified generally by the reference numeral 61. Inwardly of this cavity 61, the aforenoted ring gear 39 is positioned. This ring gear is held in place by a plurality of set screws 62, which are threaded through the hub portion 41 and specifically the flange portion 59 thereof.

It will be seen that the front wheel 22 and specifically the hub portion 41 are journalled on an axle shaft 63 that is affixed to the front fork 19 and specifically the side portions 19a and 19b thereof.

The hydrostatic motor 36 is, as has been noted, of the swash plate type and contains a motor part 64 that is formed with a plurality of circumferentially spaced cylinder bores (not shown) which support pistons that are driveably engaged with a swash plate which is also not shown. This swash plate is journalled in a housing portion 65 and is coupled to the motor drive shaft 37 in a well known manner for driving the pinion gear 38 and, accordingly, the ring gear 39.

A cover plate 66 is affixed across the cavity 61 and has a peripheral seal 67 so as to seal the transmission comprised of the pinion gear 38 and the ring gear 39. A suitable seal 68 also seals the housing portion 65 of the hydrostatic motor 36.

Figure 6:
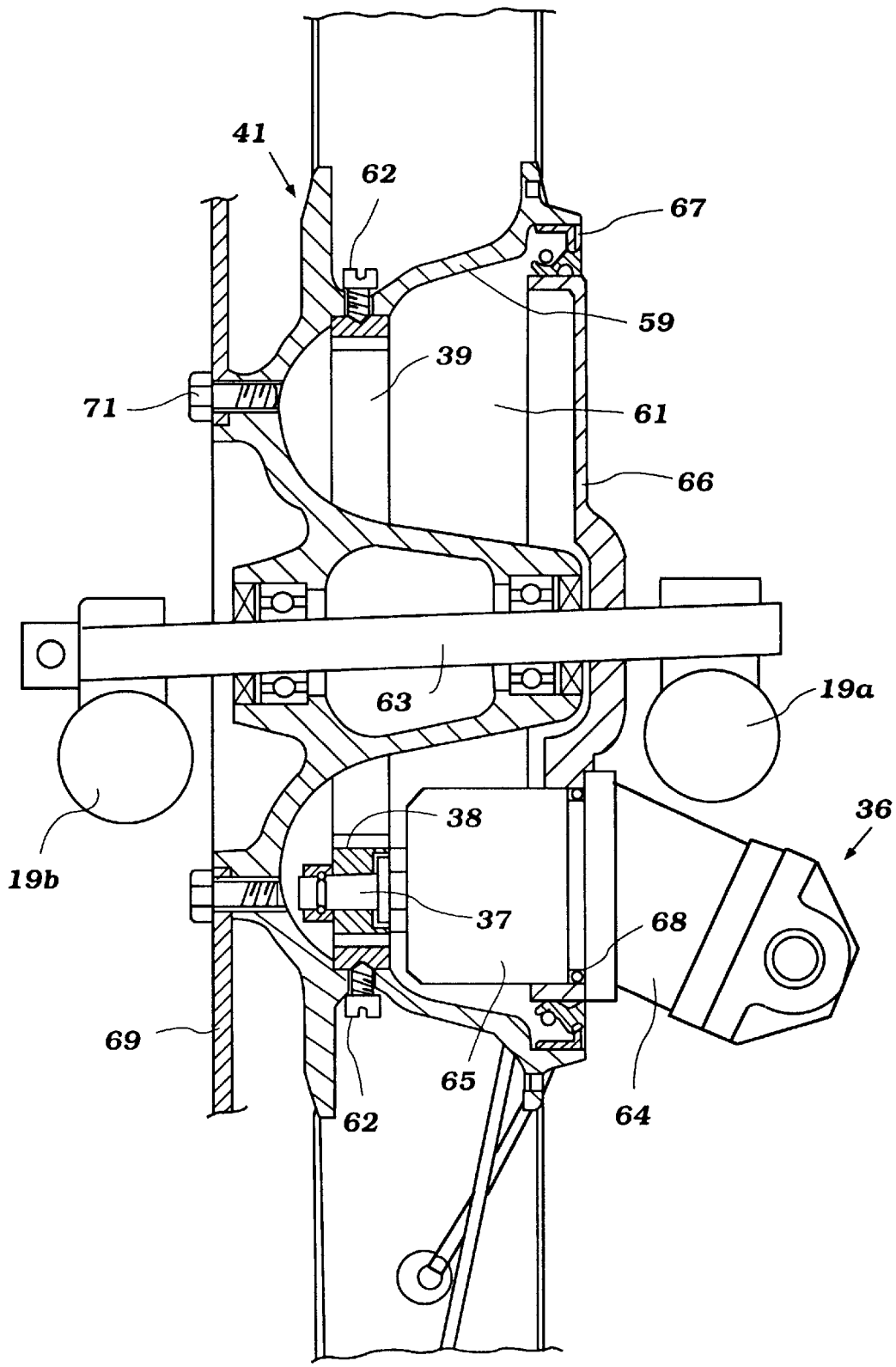
FIG. 6 is an enlarged cross-sectional view taken through the front wheel showing the drive and breaking arrangement therefor and is taken along a generally horizontally extending plane.

Referring now primarily to FIGS. 2 and 6, the construction at the opposite side of the front wheel 22 will be described. It will be seen that a brake disc 69 is affixed to the front wheel hub 41 by fastener 71. A caliper assembly 72 is carried by the front fork portion 19b and is supplied with hydraulic fluid through a conduit 74 from a master cylinder (not shown) so as to engage the front disk brake. Thus, by mounting the brake assembly on one side of the wheel and the hydrostatic drive on the other side of the wheel 22, side to side balance is maintained.

The front wheel brake comprised of the disk 69 and caliper 73 may be eliminated and the hydrostatic drive can be utilized for a brake. This is done by supplying a braking switch or valve shown schematically at 75 in FIG. 3 in the return circuit from the hydrostatic motor 36. By closing this switch 75 and closing the bypass switch 47, the pump 36 will act as a fluid brake and will slow the rotational speed of the front wheel. Thus, from the foregoing description it should be readily apparent that the described system provides a very compact and well protected hydrostatic drive for the front wheel of a vehicle having motorcycle type steering.

Of course, the foregoing description is that of preferred embodiments of the invention, and various changes and modifications may be made without departing from the spirit and scope of the invention, as defined by the appended claims.

What is claimed is:

1. A vehicle comprised of a frame assembly, an internal combustion engine mounted by said frame assembly, at least one rear wheel journalled for rotation at the rear of said frame assembly, a first transmission for driving said rear wheel from said internal combustion engine, at least one front wheel dirigibly supported at the front of said frame assembly by a fork for steering of said vehicle, said front wheel having a hub portion defining a cavity closed at one side a cover plate, a hydrostatic motor mounted at least in part by said cover plate within an area encompassed by said front wheel hub portion, a second transmission within said cavity for driving said front wheel from said hydrostatic motor, said hydrostatic motor being of the swash plate type and having an output shaft that is parallel to the axis of rotation of said front wheel about said fork and disposed at an acute angle to the pistons which drive the swash plate thereof so that said motor is angled away from said fork while being juxtaposed thereto, a pump, a third transmission driving said pump from said internal combustion engine, and a hydraulic circuit interconnecting said pump with said hydrostatic motor for selectively driving said hydrostatic motor and said front wheel.

2. A vehicle as set forth in claim 1 wherein the second transmission comprises a ring gear supported within an internal portion of the front wheel hub portion and a pinion gear driven by the hydrostatic motor and engaged with the ring gear.

3. A vehicle as set forth in claim 2 wherein the ring gear and a portion of the hydrostatic motor are enclosed within the cavity formed internally in the front wheel hub portion.

4. A vehicle as set forth in claim 3 wherein the acute angle extends to the rear of the front wheel rotational axis.

5. A vehicle comprised of a frame assembly, an internal combustion engine mounted by said frame assembly, at least one rear wheel journalled for rotation at the rear of said frame assembly, a first transmission for driving said rear wheel from said internal combustion engine, at least one front wheel dirigibly supported at the front of said frame assembly for steering of said vehicle by a front fork, said front wheel having a hub portion, a hydrostatic motor mounted by said frame assembly within an area encompassed by said front wheel hub portion, a second transmission for driving said front wheel from said hydrostatic motor, said second transmission comprising a ring gear supported within an internal portion of said front wheel hub portion and a pinion gear driven by said hydrostatic motor and engaged with said ring gear, said ring gear and a portion of said hydrostatic motor being enclosed within a cavity formed internally in said front wheel hub portion and closed by a closure plate affixed thereto, a pump, a third transmission driving said pump from said internal combustion engine, and a hydraulic circuit interconnecting said pump with said hydrostatic motor for selectively driving said hydrostatic motor and said front wheel.

6. A vehicle as set forth in claim 5 wherein the pinion gear is engaged with the ring gear on one side of a plane passing through the center of the front wheel and extending perpendicularly to the axis of rotation thereof and the hydrostatic motor is on the other side of said plane.

7. A vehicle as set forth in claim 5 wherein the hydrostatic motor is of the swash plate type and has an output shaft that is disposed at an acute angle to the pistons which drive the swash plate thereof.

8. A vehicle as set forth in claim 7 wherein the acute angle extends to the rear of the front wheel rotational axis.

9. A vehicle as set forth in claim 8 wherein the pinion gear is engaged with the ring gear on one side of a plane passing through the center of the front wheel and extending perpendicularly to the axis of rotation thereof and the hydrostatic motor is on the other side of said plane.

10. A vehicle as set forth in claim 5 wherein the vehicle has only one rear wheel and only one front wheel.

11. A vehicle having only two wheels and comprised of a frame assembly, an internal combustion engine mounted by said frame assembly, a single rear wheel journalled for rotation at the rear of said frame assembly, a first transmission for driving said rear wheel from said internal combustion engine, a single front wheel dirigibly supported at the front of said frame assembly for steering of said vehicle, said front wheel having a hub portion, a hydrostatic motor mounted by said frame assembly within an area encompassed by said front wheel hub portion, a second transmission for driving said front wheel from said hydrostatic motor, a pump, a third transmission driving said pump from said internal combustion engine, and a hydraulic circuit interconnecting said pump with said hydrostatic motor for selectively driving said hydrostatic motor and said front wheel, said hydrostatic motor being of the swash plate type and having an output shaft that is disposed at an acute angle to the pistons which drive the swash plate thereof.

12. A vehicle as set forth in claim 10 wherein the second transmission comprises a ring gear supported within an internal portion of the front wheel hub portion and a pinion gear driven by the hydrostatic motor and engaged with the ring gear.

13. A vehicle as set forth in claim 12 wherein the ring gear and a portion of the hydrostatic motor are enclosed within a cavity formed internally in the front wheel hub portion and closed by a closure plate affixed thereto.

14. A vehicle as set forth in claim 13 wherein the hydrostatic motor is of the swash plate type and has an output shaft that is disposed at an acute angle to the pistons which drive the swash plate thereof.

15. A vehicle as set forth in claim 14 wherein the acute angle extends to the rear of the front wheel rotational axis.

16. A vehicle as set forth in claim 13 wherein the front wheel is dirigibly supported by a front fork.

17. A vehicle as set forth in claim 16 wherein the pinion gear is engaged with the ring gear on one side of a plane passing through the center of the front wheel and extending perpendicularly to the axis of rotation thereof and the hydrostatic motor is on the other side of said plane.

18. A vehicle as set forth in claim 16 wherein the hydrostatic motor is of the swash plate type and has an output shaft that is disposed at an acute angle to the pistons which drive the swash plate thereof.

19. A vehicle as set forth in claim 18 wherein the acute angle extends to the rear of the front wheel rotational axis.

20. A vehicle as set forth in claim 19 wherein the pinion gear is engaged with the ring gear on one side of a plane passing through the center of the front wheel and extending perpendicularly to the axis of rotation thereof and the hydrostatic motor is on the other side of said plane.

* * * * *